(12) United States Patent
Halko, Jr. et al.

(10) Patent No.: US 7,357,191 B1
(45) Date of Patent: Apr. 15, 2008

(54) WEARABLE HEIGHT ADJUSTABLE EQUINE LEG REST

(75) Inventors: John J. Halko, Jr., Jasper, GA (US); William W. Johnson, Summerville, GA (US)

(73) Assignee: American Farrier Systems, LLC, Talking Rock, GA (US)

( * ) Notice: Subject to any disclaimer, the term of this patent is extended or adjusted under 35 U.S.C. 154(b) by 0 days.

(21) Appl. No.: 11/620,251

(22) Filed: Jan. 5, 2007

(51) Int. Cl.
*A01L 11/00* (2006.01)

(52) U.S. Cl. .................................................. 168/44

(58) Field of Classification Search ............ 168/44–47, 168/48.1, 48.2; 119/755, 814, 816; 248/688; 224/149, 586, 580, 222, 661, 660, 662, 267, 224/270; D30/138, 143
See application file for complete search history.

(56) References Cited

U.S. PATENT DOCUMENTS

| | | | |
|---|---|---|---|
| 89,379 A | 4/1869 | Blackburn | |
| 124,452 A * | 3/1872 | Shimer | 168/44 |
| 228,160 A * | 5/1880 | York | 168/48.1 |
| 286,389 A | 10/1883 | Coffey | |
| 339,375 A * | 4/1886 | Cherrier | 168/44 |
| 457,345 A | 8/1891 | Fox | |
| 533,604 A | 2/1895 | McHugh | |
| 1,146,163 A * | 7/1915 | Holmes | 168/44 |
| 1,198,467 A | 9/1916 | Maltby | |
| 1,330,807 A | 2/1920 | Ilieff | |
| 6,325,154 B1 | 12/2001 | Keeler | |
| 6,640,905 B2 | 11/2003 | Keeler | |
| D491,699 S | 6/2004 | Keeler | |
| D509,327 S | 9/2005 | Keeler | |
| 2002/0108758 A1 | 8/2002 | Keeler | |
| 2004/0140104 A1 | 7/2004 | Keeler | |
| 2006/0113090 A1 | 6/2006 | DeCola et al. | |

FOREIGN PATENT DOCUMENTS

GB 1349468 * 10/1971

* cited by examiner

*Primary Examiner*—Son T. Nguyen
(74) *Attorney, Agent, or Firm*—Morris, Manning & Martin, LLP

(57) ABSTRACT

A portable, wearable, height adjustable equine leg rest that is removably supported on the lower leg of a person such as a farrier or veterinarian. A generally U-shaped padded hoof cradle receives and supports the lower leg of a horse for hoof work. A conforming elongate human leg support member is adapted for positioning along the lower leg of a person. A retaining device is provided for releasably retaining the leg support member on the person's leg. A height-adjustable extendable member provides a height adjustment for the hoof cradle. A ground contacting foot is affixed to the bottom end of the equine leg rest and transfers weight to the ground. The hoof cradle is mounted to the upper region of the leg rest, but extends to a side of the human leg support member such that the hoof cradle extends outwardly of the person's leg.

20 Claims, 9 Drawing Sheets

WEARABLE HEIGHT ADJUSTABLE EQUINE LEG REST

FIELD OF THE INVENTION

The present invention relates generally to an equine leg or hoof rest, and more particularly relates to a portable, wearable, height-adjustable equine leg or hoof rest that affixes to the leg of a farrier or veterinarian or horse owner, to assist in supporting the lower leg of a horse in a horseshoeing operation or other treatment of the horse's hoof.

BACKGROUND

Horse owners, veterinarians, and farriers generally agree that it is difficult to hold a horse's foot in an accessible position for treating the horse's hoof or shoeing the horse. Such people often need to pick up and inspect the leg of a horse to check for lameness, pick out the hoof, change screw stubs, give a minor trim, or shoe the horse. Such treatment generally requires some lateral (outward) movement of the horse's leg to expose the leg or hoof for inspection or work. However, horses generally do not appreciate having their leg moved in a lateral direction relative to their body. The leg of a horse bends backwards but not outwardly or laterally. A sideways pull on a horse's leg causes strain on the horse and the holder. Furthermore, nervous, stocky built, or short legged horses have a difficult time allowing their front legs to be pulled far enough laterally for most people to hold the leg in a mutually comfortable position. And, it is dangerous and uncomfortable for a person to hold a horse's leg between their leg or over their thigh.

Farrier's shoeing stands have long been known in the art and come in various different configurations. U.S. Pat. No. 89,379 to Blackburn describes a height-adjustable rest for shoeing horses. U.S. Pat. No. 286,389 to Coffey describes a horse shoeing stand that is mounded to a bench or base that rests on the ground. U.S. Pat. No. 457,345 to Fox describes a horseshoe stand. U.S. Pat. No. 533,604 describes a farrier's shoeing stand on which the farrier can sit. U.S. Pat. No. 1,198,467 to Maltby describes a shoeing jack with a hoof cradle that is spring-resilient, and also rests on the ground. U.S. Pat. No. 1,330,807 to Ilieff describes a horse shoeing jack that is height-adjustable.

More recent horse owner's and farrier's stands are described in various U.S. patents and Patent Application Publications to Keeler, including U.S. Pat. No. 6,640,905, U.S. Pat. No. 6,325,154, D491,699, D509,327, Pub. No. 2002/0108758, and Pub. No. 2004/0140104. U.S. Patent Publication No. 2006/0113090 to DeCola et al describes a hoof support stand that includes a flattened tripod base and a vertical support which may be changed from pillar to cradle, with height adjustment.

All of these approaches to supporting a horses hoof for shoeing or other treatment operation suffer the same disadvantage in that all include large or heavy, relatively difficult to move bases or platforms upon which the hoof rest or cradle is mounted. With the known devices, either the stand must be moved into a position relative to a generally unmoving horse or the horse must be moved to the stand if the stand is sufficiently heavy and difficult to move. Either way, horses do not generally like to be moved or have their legs moved laterally, and there remains the problem of providing a useful hoof rest or cradle that can be readily positioned near the horse's leg, while minimizing undesirable lateral movement of the horse's leg or other movement of the horse to get in position for the operation to the hoof, while still providing a convenient rest for the farrier or veterinarian.

Accordingly, there is a need for a different approach to supporting a horse's hoof for a farrier or veterinarian to inspect or work on a horse's hoof. As will be described and explained in detail below, the present inventors have constructed an improved, portable, wearable equine leg rest that supports a horse's lower leg and/or hoof, in a manner comfortable for the horse and comfortable for the wearer, to allow the wearer to conveniently and comfortably attend to the horse's leg and/or hoof with minimal annoyance to the horse.

SUMMARY OF THE INVENTION

Briefly described, and according to a preferred embodiment, the present invention relates to an equine leg rest that is wearably supported on a human's leg, for supporting the lower leg of a horse. A human leg support member is adapted to be held in position along the lower leg of a person. A generally U-shaped padded hoof support cradle is operatively associated with the human leg support member for receiving and supporting the lower leg and/or hoof of a horse. The hoof cradle extends to a side of the human leg support member such that the U-shaped cradle extends outwardly of the wearer's leg for supporting a horse's leg. A height adjusting mechanism is provided for adjusting the height of the U-shaped hoof support cradle relative to the ground. A retaining device, such as one or more pliable rubber straps, is affixed to the human leg support member for releasably retaining the leg support member to a wearer's leg. A ground contacting foot is operatively associated with the human leg support member for transmitting weight of a horse's leg to the ground.

According to one aspect, the human leg support member is elongate and generally trough-like, and conforms to a person's lower leg. Padding is provided on this support member for the wearer's comfort.

According to another aspect, the height adjusting mechanism comprises a slidably adjustable extendable member that slides relative to the human leg support member but can be fastened with a wing nut or knob. In one aspect, the ground contacting foot is affixed to the bottom end of the extendable member.

According to still another aspect, the U-shaped hoof support cradle is affixed to the upper end of the human leg support member.

Preferably, the padding on the hoof cradle comprises replaceable polyurethane foam padding affixed to the interior of the hoof support cradle.

Another embodiment of the invention is an equine leg rest that is wearably supported on a wearer's leg for supporting the lower leg of a horse, and comprises a generally U-shaped padded hoof support cradle for receiving and supporting the lower leg and/or hoof of a horse. A generally half-cylindrical, elongate human leg support member is adapted to be held in position along the lower leg of a wearer. A retaining device such as one or more resilient straps is affixed to the human leg support member for releasably retaining the leg support member to a wearer's leg. A height-adjustable extendable member is attached to the human leg support member, for providing a height adjustment to the U-shaped hoof support cradle. The U-shaped hoof support cradle is mounted to the upper region of the equine leg rest, but extends to a side of the leg support member such that the U-shaped cradle extends outwardly of the wearer's leg for supporting a horse's leg.

This embodiment further includes a lower supporting foot affixed to the extendable member for contacting with the ground and providing support for the device and a supported horse's leg.

According to one aspect, the height adjusting extendable member is slidably adjustable with respect to the human leg support member, and fastened at a particular height by a wing nut or knob threaded to a fastening bolt or screw. The height adjustment is made with a screw type fastening device that releasably holds the height adjusting extendable member to the human leg support member.

According to this aspect of the invention, the extendable member is supported for slidable movement relative to the leg support member by a pair of retaining plates attached to opposite sides of the leg support member.

In this embodiment, the U-shaped padded hoof support cradle comprises a generally U-shaped half cylindrical metal trough and replaceable polyurethane padding. Further, the human leg support member preferably includes replaceable polyurethane padding for the wearer's comfort.

According to one aspect, the retaining device comprises a pair of removable elongate pliable straps that extend from one lateral edge of the leg support member to an opposite lateral edge. The leg support member includes a plurality of retaining balls mounted to the sides of the leg support member, for engaging with corresponding slotted openings in the pliable straps and retaining the straps.

Still more particularly described, an embodiment of the present invention is an equine leg rest that is wearably supported on a human's leg, for supporting the lower leg of a horse. A generally U-shaped hoof support cradle is provided for receiving and supporting the lower leg and/or hoof of a horse. Replaceable padding is affixed within and about the U-shaped hoof support cradle. A generally trough-like, elongate conforming human leg support member is adapted to be held in position along the lower leg of a wearer. At least one elongate pliable leg strap is provided, which includes a plurality of slotted openings for releasably receiving and holding retaining balls mounted to the leg support member to attach the leg support member to a wearer's lower leg. At least one pair of retaining balls is mounted to the leg support member for releasably holding the pliable leg strap. A slidably adjustable extendable member is affixed to the human leg support member, for providing a height adjustment to the U-shaped hoof support cradle. A lower supporting foot is affixed to the bottom of the extendable member for contacting with the ground and providing support for the device and a supported horse's leg. The U-shaped hoof support cradle is mounted to the upper region of equine leg rest, but extending to a side of the human leg support member such that the U-shaped cradle extends outwardly of a wearer's leg for supporting a horse's leg while the lower supporting bracket or foot rests on the ground to provide support.

In such an embodiment, the height adjustment is made with a screw type fastening device that releasably holds the height adjusting extendable member to the human leg support member. The extendable member is supported for slidable movement relative to the leg support member by a pair of retaining plates attached to opposite sides of the leg support member.

These and other aspects, features, and benefits of the present invention(s) will become apparent from the following detailed written description of the preferred embodiments taken in conjunction with the following drawings, although variations and modifications therein may be effected without departing from the spirit and scope of the novel concepts of the disclosure.

BRIEF DESCRIPTION OF THE DRAWING FIGURES

Figure 4:
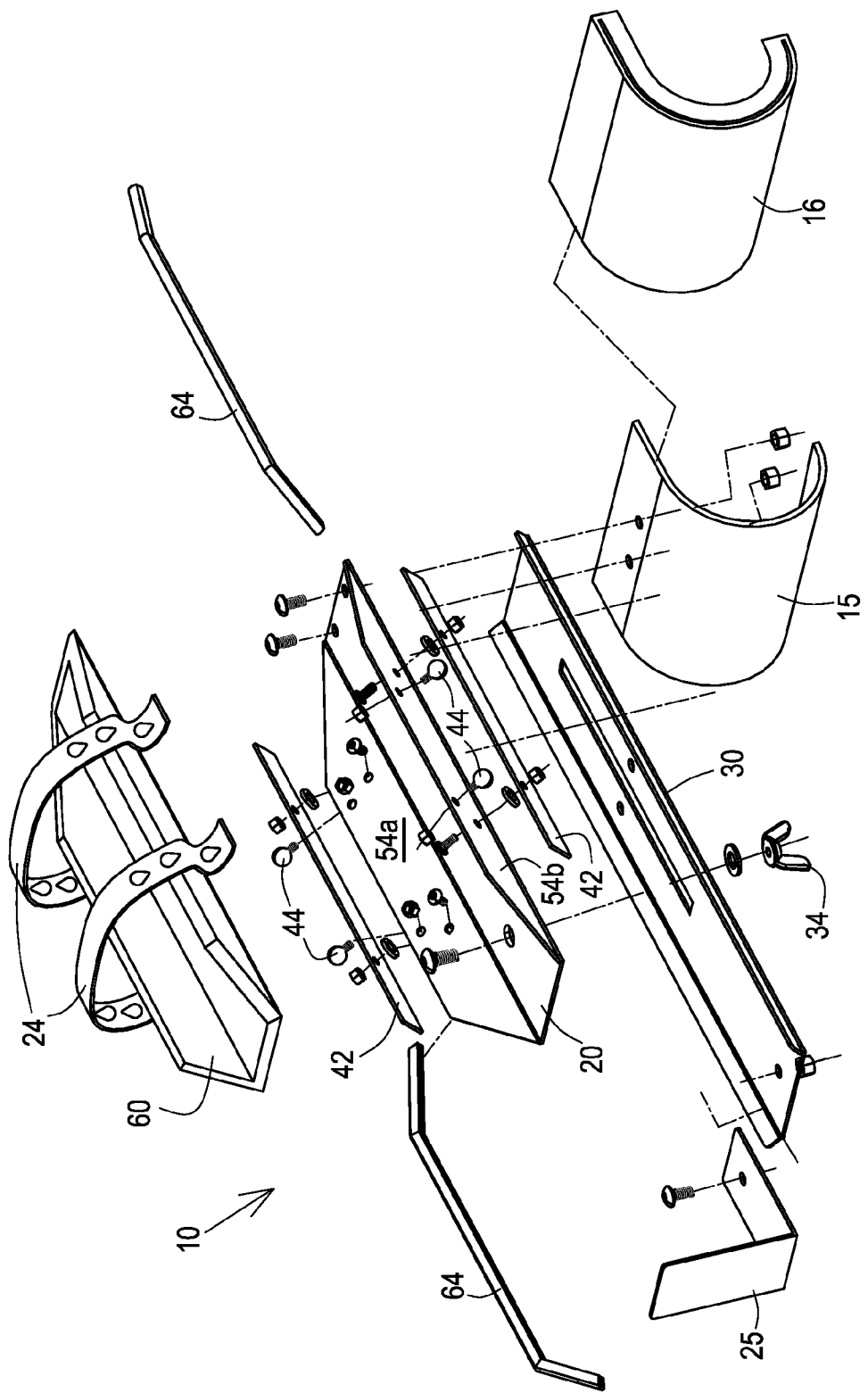

FIG. 4 an exploded perspective view of the preferred embodiment of the equine leg rest according to the present invention.

Figure 5:
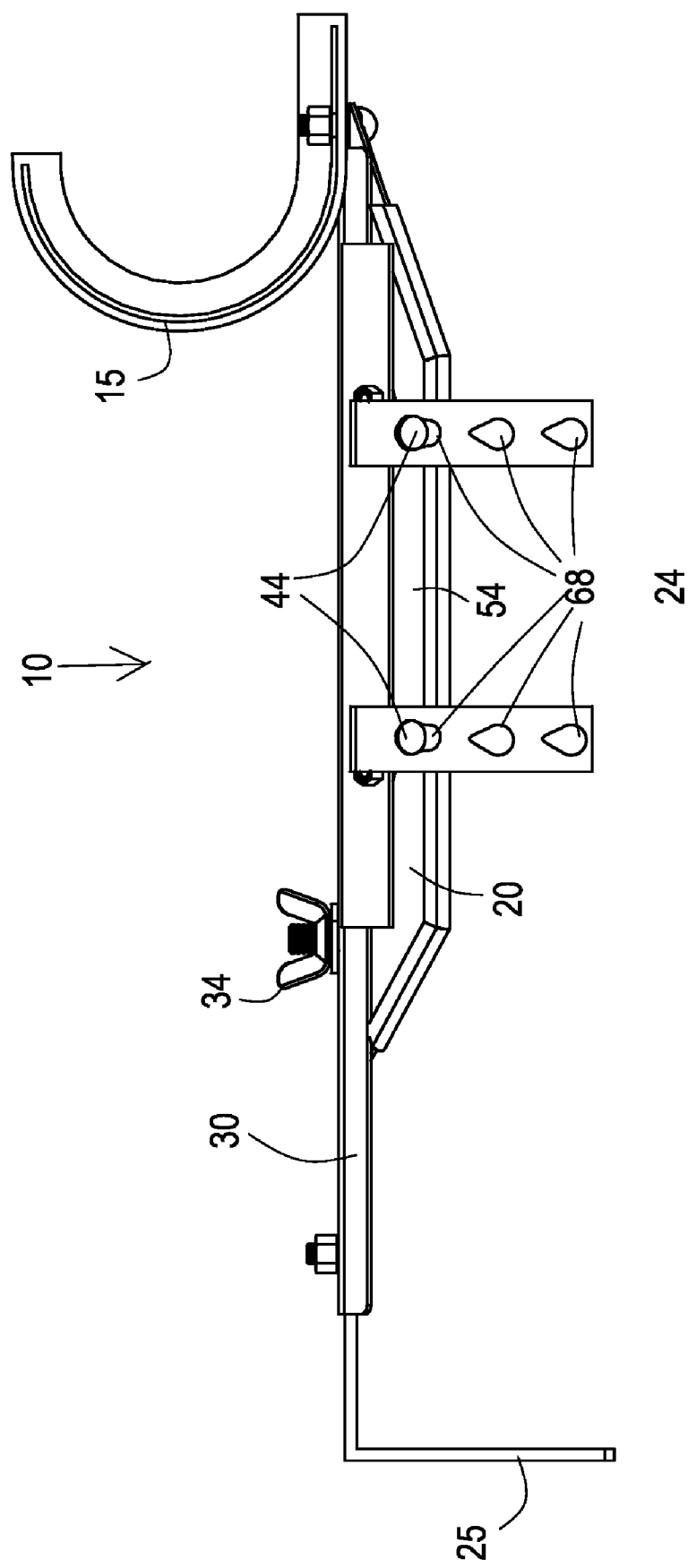

FIG. 5 is a side view of the equine leg rest according to the preferred embodiment of the invention.

Figure 6:
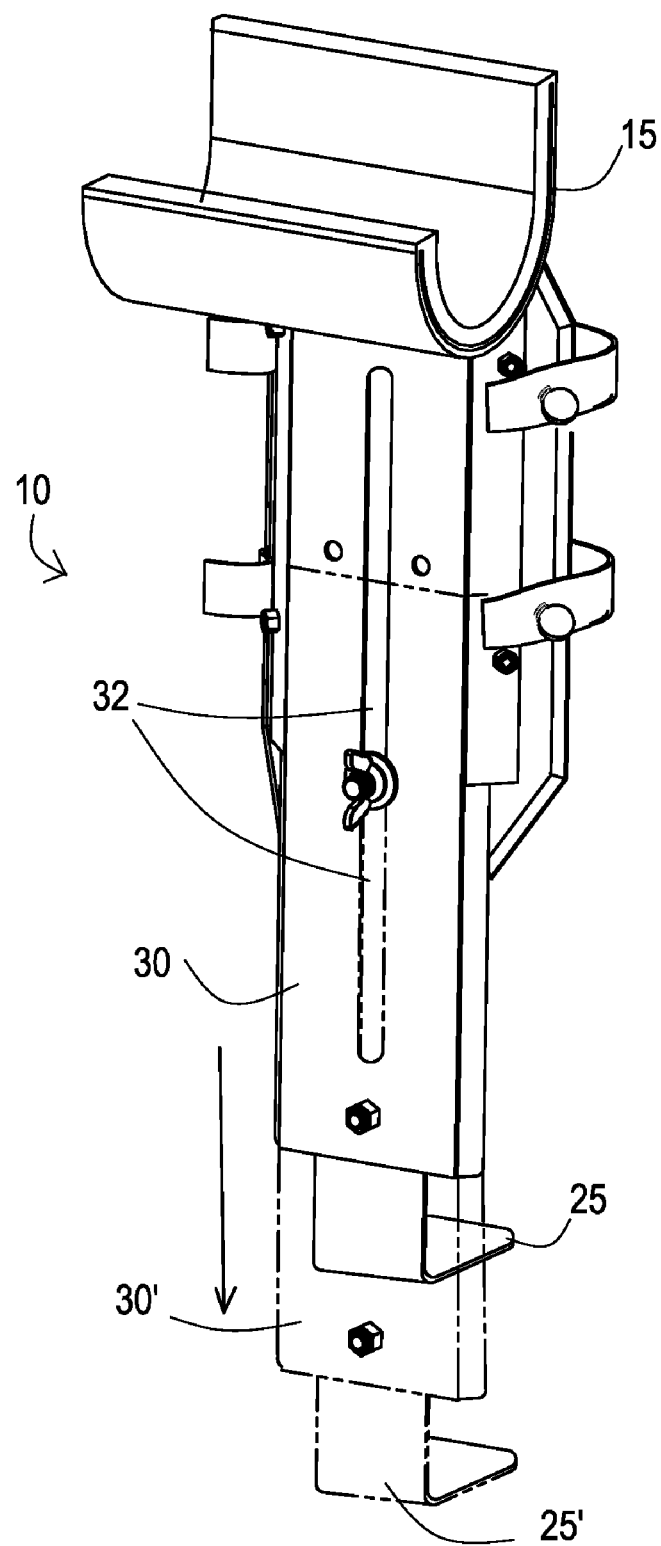

FIG. 6 is a perspective exterior view of one side of the equine leg rest, showing the extended position in phantom.

Figure 7:
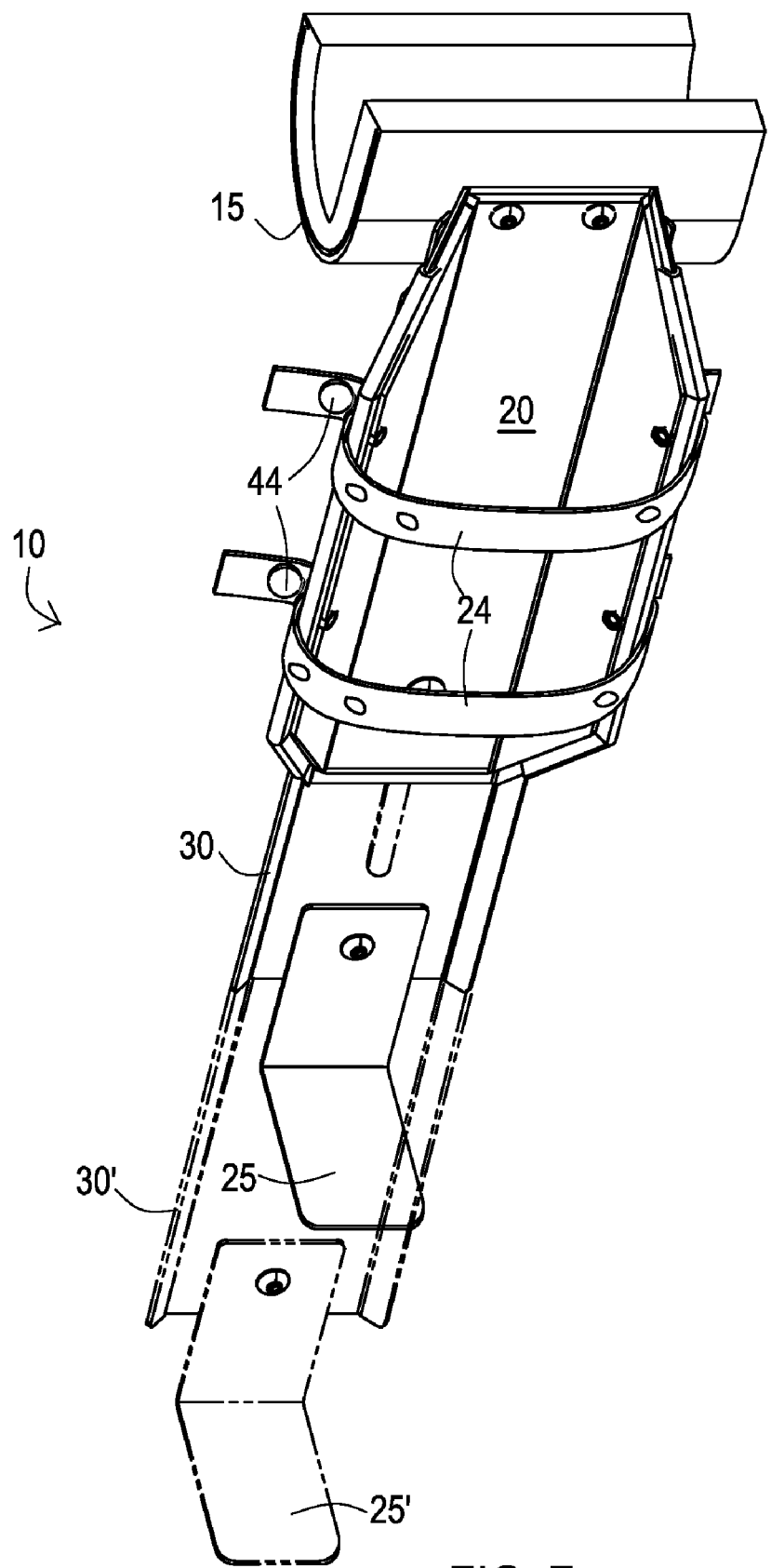

FIG. 7 is an interior view of the equine leg rest according to the invention, showing the extended position in phantom.

Figure 8:
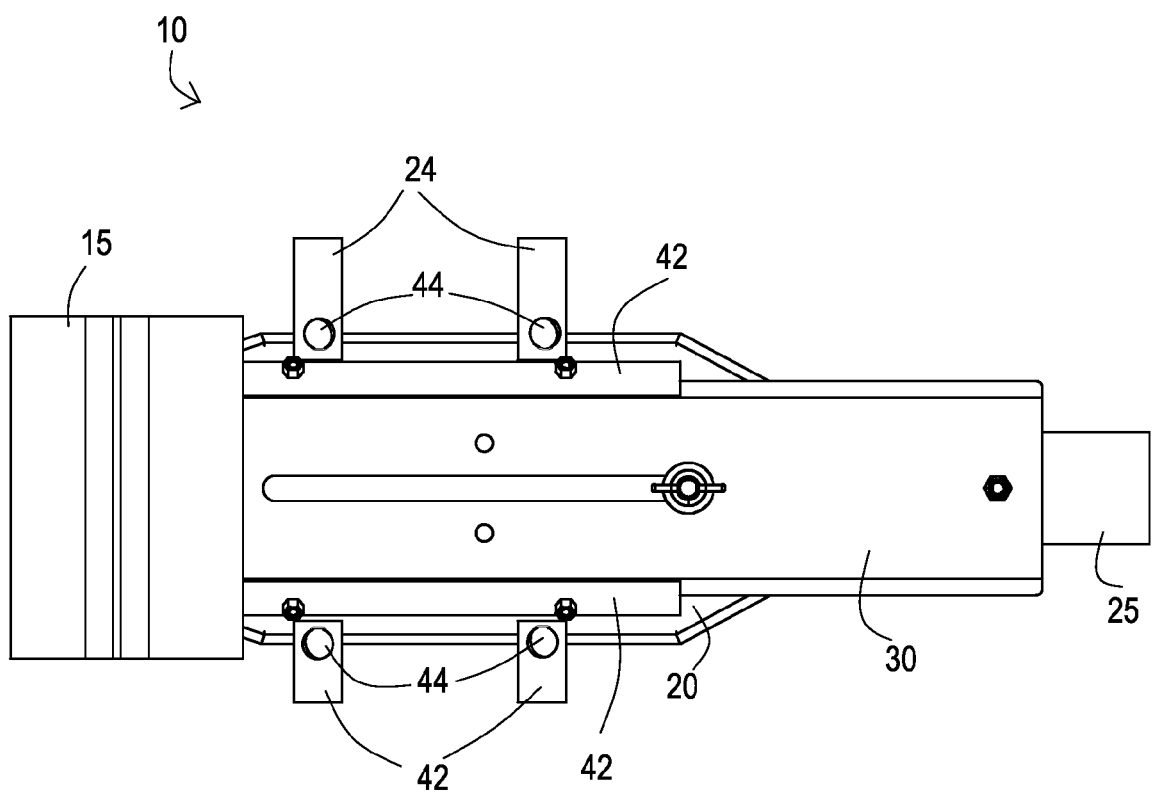

FIG. 8 is a front or outside view of the equine leg rest according to a preferred embodiment.

Figure 9:
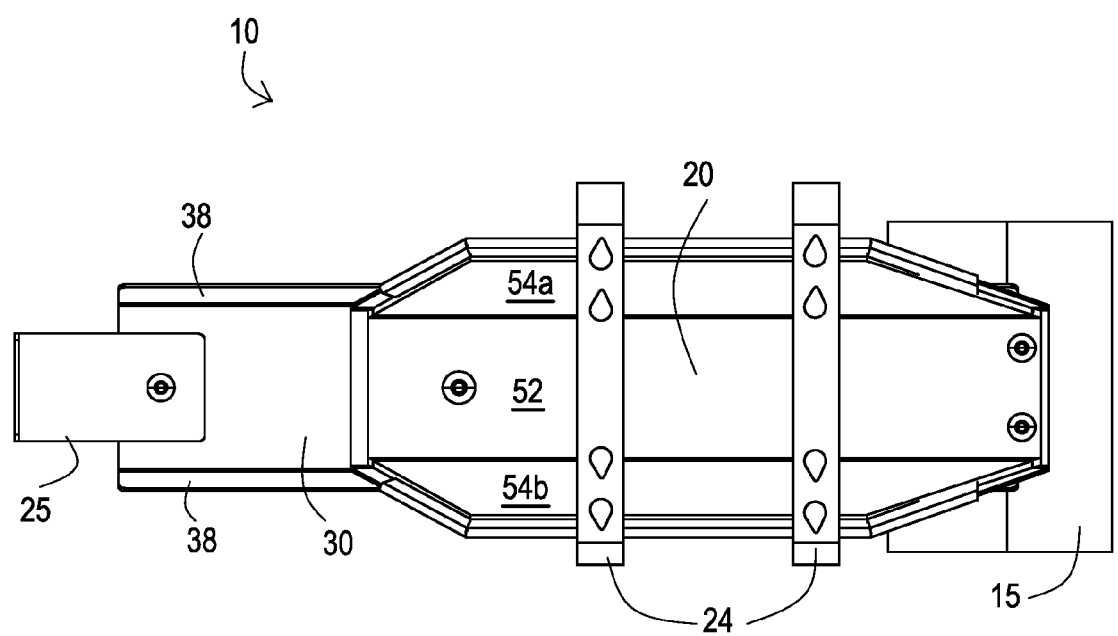

FIG. 9 is an interior view of the preferred embodiment of the equine leg rest.

DETAILED DESCRIPTION

Figure 1:
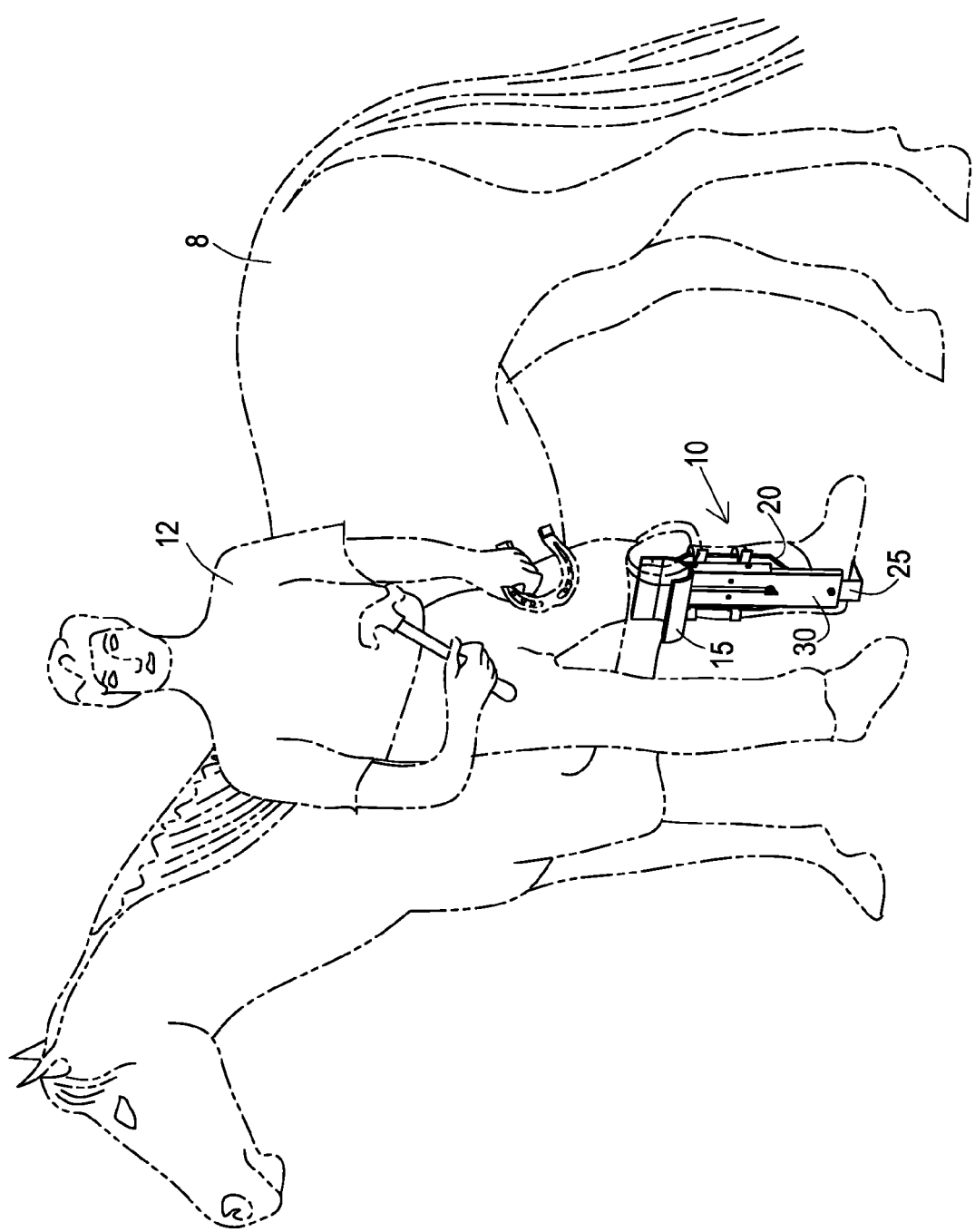
FIG. 1 illustrates a wearable, height-adjustable equine leg rest according to a preferred embodiment of the invention, as the leg rest would be used in practice.

Referring now to the drawings, in which like numerals illustrate like elements throughout the several drawing figures, FIG. 1 illustrates a horse 8 with its left front leg supported in a wearable, height-adjustable equine leg rest 10 constructed in accordance with the preferred embodiment of the present invention. The disclosed equine leg rest 10 is shown attached to the lower leg of a human being wearer 12, such as a farrier, veterinarian, horse owner, or the like. The equine leg rest 10 includes a hoof support cradle 15, a leg support member 20 that is fastened around the lower leg of the wearer 12, and a lower ground supporting bracket or foot 25 positioned underneath the foot of the person 12 and contacting with the ground, to support the leg rest and horse's foot. A height-adjusting extendable member 30 is provided for height adjustability, as will be described in greater detail below.

Although the drawing of FIG. 1 shows the leg rest 10 with the cradle 15 positioned between the wearer's leg, it should be understood that the leg rest may be positioned on the wearer's leg such that the cradle extends to the outside of the wearer's leg instead of between the legs. The device may be worn in either position. Typically, the wearer may want to wear the leg rest with the cradle 15 between his or her legs when attending to a front foot, but with the cradle extending to the outside of the leg when attending to a hind foot.

Traditionally, a person 12 attending to a horse's hoof or leg stands alongside and faces the rear of the horse 8 when picking up a horse's leg. Prior to the present invention, the horse's foot would then be picked up by hand and then placed across the person's nearest leg when working on the hind leg. Facing to the rear of the animal again, the front foot would normally be picked up and inserted between the person's leg. This method of holding the limbs of horses has been practiced for thousands of years and is best described as tiring for the person because of the unnatural position the person must assume (with legs bent at the knees). Such a method is also dangerous given the unpredictable nature of the equine and close proximity of the person to the horse's leg during the inspection and work. A lateral (outward) pull of the horse's leg can cause even a well-tempered horse to go off-balance, and if ill-tempered trigger a reaction moving the leg or kicking.

With the present invention, a person 12 attending to a horse's foot may still assume the position of facing the rear of the horse when attending to either front or hind legs, but can attend to the work more comfortably by resting the horse's leg and/or hoof in the cradle 15, at a height selected to be as mutually comfortable as possible for both the person 12 and the horse 8, with significant weight of the horse's leg transferred to the ground through the leg rest 10. When necessary due to animal movement or skittishness, the hoof can quickly exit from the cradle 15, and the wearer 12 can reposition himself or herself readily to resume the work, and replace the leg in the cradle as repositioned. Such an advantage is provided by the light weight and portability of the disclosed leg rest 10, which is removably attached to the wearer's lower leg.

After the horse's leg is placed in the cradle 15, the wearer 12 can straighten up to some degree, even to the complete vertical. This will remove the strain from the person's back and legs, and increase the comfort during use. The wearer can then bend over to work on the leg or hoof, and straighten up to relieve back or leg fatigue. As almost no effort is required to maintain the horse leg in the cradle, one can work on horses for hours if necessary, and the horse can remove its leg when the urge hits. The device can be used on horses, mules, donkeys, and most any four-legged animals, especially larger ones.

Figure 2:
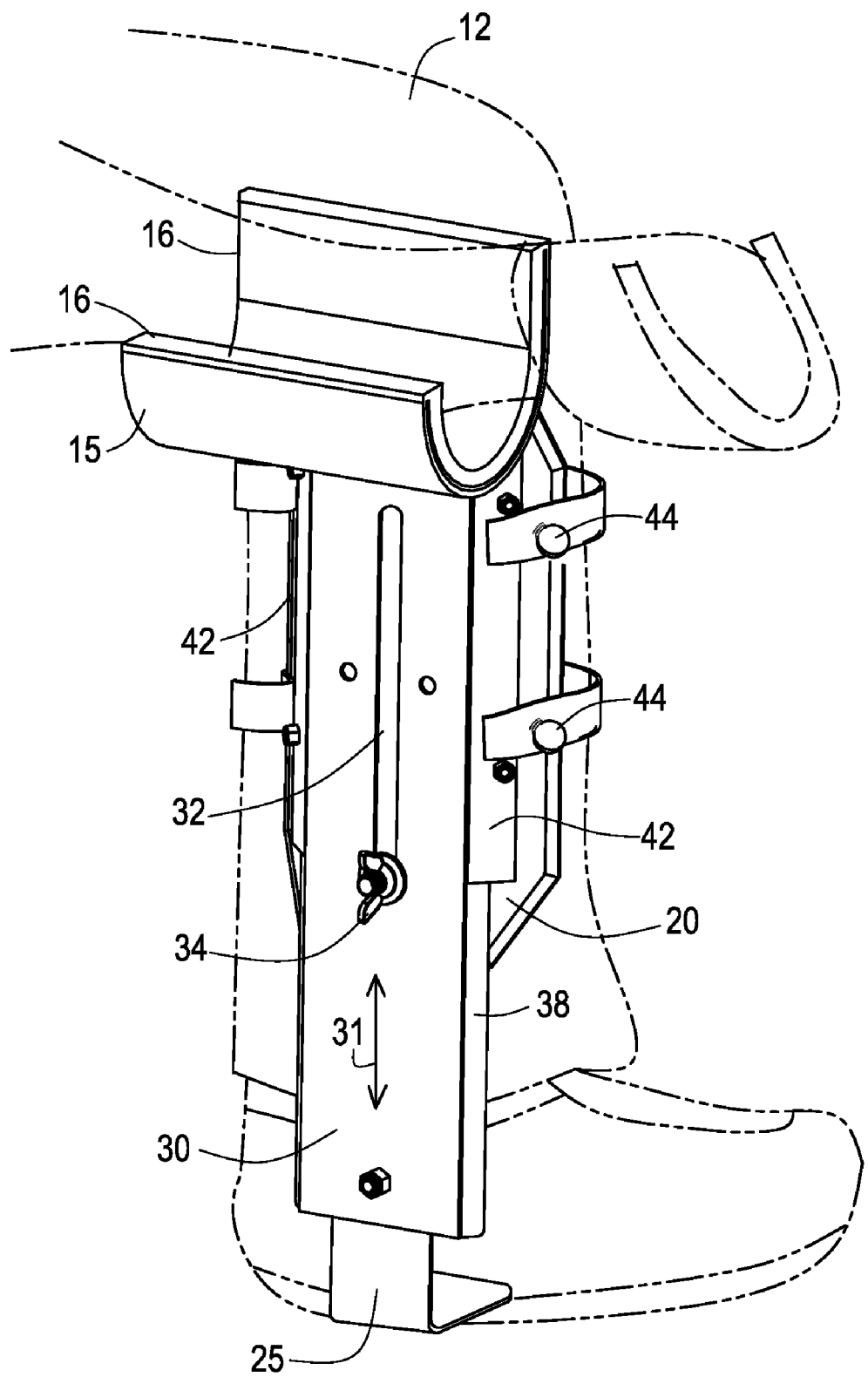
FIG. 2 illustrates an equine leg rest exterior view, according to the preferred embodiment of the invention.

FIG. 2 is an outside view of the equine leg rest 10, shown affixed to the lower leg of a person 12 (which leg is shown in phantom). The leg rest 10 comprises a generally U-shaped or half-cylindrical cradle 15 that receives and supports the lower leg of a horse including the hoof (shown in phantom). The cradle is preferably made of arcuate bended metal such as aluminum or sheet metal, of a sufficient thickness to provide good support, although other materials such as molded polystyrene, polyvinyl chloride (PVC), polycarbonate, or other similar material. The preferred hoof support cradle 15 is open at the top for receiving the horse's leg, and is provided with a polyurethane foam padding 16, at least on the interior of the U-shaped portion, and preferably along the outside as well. Preferably, the polyurethane padding 16 is held in position on the cradle with an adhesive backing, and is therefore readily replaceable when the padding becomes worn or torn. Further, the padding preferably extends to and covers the outer lateral edges of the cradle to protect the horse and the wearer from any sharp edges from the material of the cradle.

The cradle 15 is preferably well opened at the top, with sides more diverging than converging, and contains no straps or other means that would restrain the horse's leg or hoof. As horses are somewhat nervous by nature, such an open configuration is preferable for the cradle as it allows the horse to remove its leg at will.

The hoof support cradle 15 is preferably mounted to the top end of the leg support member 20, which is general trough-shaped to adapt and conform to the lower leg of the wearer 12. The cradle is mounted to the top end of the leg support member with nuts and bolts, as shown in other figures, and preferably covered with foam padding.

A slidable extendable member 30 is affixed to the leg support member 20 and moves upwardly and downwardly in the direction of the arrow 31 to provide for height adjustment. A threaded bolt extends through the leg support member 20 and into an elongate slot 32 in the extendable member 30, and held in place with a wing nut 34. By loosening the wing nut 34 from the bolt, the extendable member 30 can be slidably positioned along the surface of the leg support member 20 so as to provide for height adjustment. The extendable member 30 comprises a generally U-shaped plate including sides 38 that form the legs of the "U" and engage with corresponding surfaces of the leg support member 20.

The extendable member 30 and sides 38 are slidable retained against the leg support member 20 by a pair of elongate metal retaining plates 42. The retaining plates 42 are held in spaced apart relation with respect to the leg support member 20 by a pair of bolts, spacers, and nuts, which are best seen in other figures.

The leg support member 20 is held against the wear's leg by resilient elastic (e.g. rubber) retaining straps 24 (two are shown in FIG. 2, although more could be utilized), which are held in place by retaining balls 44. The retaining balls 44 are mounted to the sides of the leg support member, toward the outer edges thereof. The retaining straps 24 include slotted openings, best seen in other figures, that are deformably pressed over the retaining balls.

Figure 3:
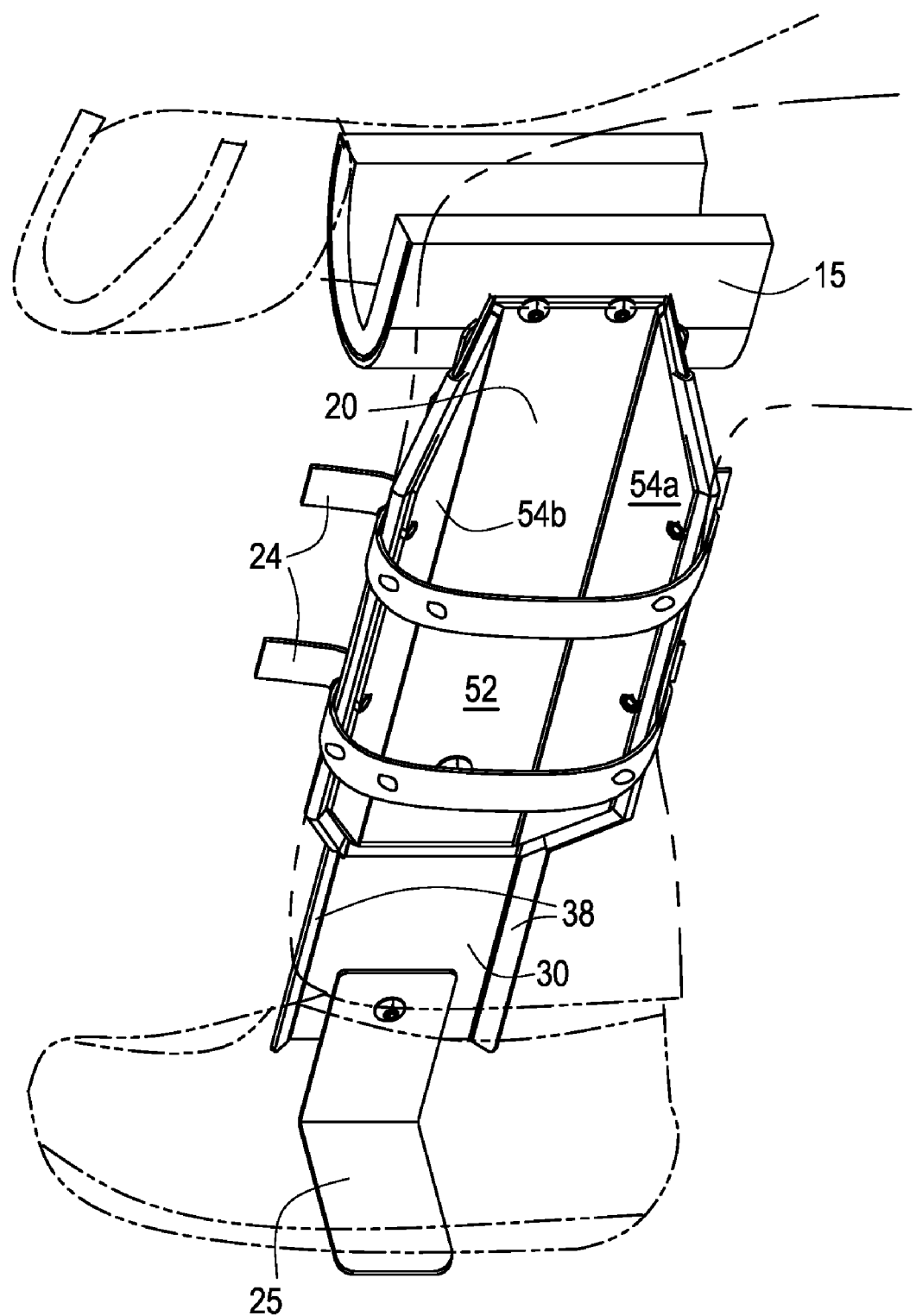
FIG. 3 is an interior view of the equine leg rest of FIG. 2.

FIG. 3 shows an interior view of the leg support member 20 that fits against the wearer's leg, shown in phantom. The lower ground supporting bracket or foot 25 is shown affixed to the bottom of the extendable member 30 by at least a nut and bolt, or similar retaining means. The bracket or foot 25 is generally L-shaped, with a portion that extends over and is affixed to the extendable member 30 and a portion that extends under the wearer's foot, contacts with the ground, and transmits weight to the ground.

As can be seen in FIG. 3, the leg support member 20 is generally trough-shaped, with an interior rectangular central plate 52 and two trapezoidal side plates 54*a*, 54*b*, that include angled edges which provide for lateral support and wrap partially around the leg of the wearer. As can be seen, the retaining straps 24 extend from one lateral edge of a trapezoidal outer plate 54*a* to a corresponding outer edge of the other trapezoidal outer plate 54*b* of the leg support member 20. The retaining balls 44, best seen in other figures, are mounted near the lateral edges of the trapezoidal outer plates 54.

As also can be seen in FIG. 3, the extendable member 30 includes outwardly angled sides 38 that rest against the trapezoidal outer plates 54, at the crease or angle where the plates 54 meet with the central plate 52 of the leg support member 20. The sides 38 of the extendable member are thus retained for slidable movement against the leg support member by the retaining plates 42 (see FIG. 5).

As can also be seen in FIG. 3, the cradle 15 is supported at the top end of the leg support member 20. A pair of bolts and nuts (not shown) are fitted through holes that pass through both the cradle 15 and leg support member 20. Although not shown in FIG. 3, a plurality of spaced-apart pairs of holes, in a parallel arrangement, may be provided in the leg support member, so as to provide for a height adjustment of the cradle relative to the leg support member. This would permit the cradle 15 to be attached at different heights relative to the leg support member 20, while the overall height can still be adjusted by use of the wing nut 34.

Furthermore, it will be understood that the cradle 15 could be attached to a separate slidable support element (not shown) that moves relative to the leg support member 20 but at the top region thereof, with a similar slot and wing nut arrangement as shown in FIG. 2 for the extendable member 30. Such a modification would provide for a dual adjustability for the cradle 15 relative to the leg support member 20 and the extendable member 30 and foot 25 relative to the leg support member 20. Other equivalent means and approaches for height adjustability may occur to those skilled in the art.

FIG. 4 is an exploded view of the preferred embodiment of the equine leg rest 10. As can be seen relative to the leg support member 20, polyurethane foam padding element 60 shaped similarly to that of the leg support member 20 is preferably provided to cover the interior of the leg support member, including the tops of the screw heads used to fasten the device together, and provide for greater comfort as the device rests against the leg of the wearer. Additionally, plastic edge guards 64 or similar protective covering are provided along the outer edges of the trapezoidal outer plates 54 to provide protection from the edges of the leg support member 20.

FIG. 5 is a side view of the equine leg rest 10 showing the retaining balls 44 that are mounted near the outer edges of the trapezoidal outer plates 54 and provide a means for attaching and releasably holding the retaining straps 24. Preferably, the retaining straps are flexible, pliable, lengths of deformable material such as rubber that include a number of slotted openings 68 for receiving and holding the retaining balls 44. By selecting an appropriate slot for attaching to a retaining ball, a wearer can adjust the fit and tautness of the fit of the device against the leg. Preferably, retaining balls 44 are provided on both sides of the device to provide for greater adaptability and adjustment, and at least two pair are provided.

FIG. 6 is an outside view of the equine leg rest 10 with the extendable member 30 shown in a retracted (shorter) position, and shown at 30 in an extended (longer) position, to illustrate the height adjustability.

Similarly, FIG. 7 is an interior view of the device with the extendable member 30 in its initial (retracted) position 30 and in an extended position 30', with the lower ground supporting bracket or foot shown in an extended position 25' when the extendable member 30 is adjusted to a greater height.

FIG. 8 is a front plan view of the equine leg rest 10, showing the outside of the device with the hoof support cradle 15 exposed for receiving a horse hoof.

FIG. 9 is an interior view of the equine leg rest 10 that more clearly illustrates the rectangular central plate 52, trapezoidal outer plates 54*a*, 54*b* of the leg support member 20, and the angled sides of the extendable member 30.

A further modification within the inventors' contemplation as an equivalent retaining device affixed to the leg support member is a generally C-shaped leg clamp, forming a partial torus or crescent or "half moon", made of a semi-rigid, resilient material. Such an attachment device may also be described as a flexible but elastic rowlock or oarlock type device. This type of retaining device would function by partially deforming or separating at the outer cusps of the "C" shape to fit over the wearer's leg, and be retained on the leg by friction and the resilience of the material used, e.g. spring metal, thick resilient plastic material, or the like. Such an approach to a retaining device has the advantage that it may readily be placed onto and removed from the wearer's leg, without the confinement and attachment of the elastic straps, retained in place by a combination of friction and clamping around the leg. Other equivalent retaining devices may occur to those skilled in the art.

In use, a wearer of the leg rest 10 may fit the device to support a hoof between the wearer's legs, or outside the wearer's leg. Some users may not be comfortable with using the device between the legs, and may find that the better position for handling both front and hind legs of a horse involves use of the leg rest on the outside of the leg.

The device can be used in many circumstances without the elastic straps or other retaining means. A wearer may find that when the device is used between the legs, straps are not really necessary or required for use. Furthermore, it may be safer to use the device on the outside of the wearer's leg than between the legs—a horse that suddenly withdraws its leg from the cradle will tend to bring the leg inwardly toward the horse's body and thereby may pull the user toward the horse by entangling with the wearer's leg, which may cause the horse and/or the wearer to lose balance. Preferably, therefore, a wearer should not employ the retaining straps if used between the wearer's legs, and should use the device with extra caution when between the legs.

The foregoing description of the exemplary embodiments of the inventions has been presented only for the purposes of illustration and description and is not intended to be exhaustive or to limit the invention to the precise forms disclosed. Many modifications and variations are possible in light of the above teachings, and the limitations of the invention are intended only as expressed in the appended claims.

What is claimed is:

1. An equine leg rest that is wearably supported on a human's leg for supporting the lower leg of a horse, comprising:
   a generally U-shaped hoof support cradle for receiving and supporting the lower leg and/or hoof of a horse;
   a generally half-cylindrical, elongate human leg support member adapted to be held in position along the lower leg of a human being;
   a retaining device affixed to the human leg support member for releasably retaining the leg support member to a human leg;
   a height-adjustable extendable member attached to the human leg support member, for providing a height adjustment to the U-shaped hoof support cradle: and
   the U-shaped hoof support cradle mounted to the upper region of the equine leg rest, but extending to a side of the leg support member such that the U-shaped hoof support cradle extends outwardly of a human's leg for supporting a horse's leg.

2. The equine leg rest of claim 1, further comprising a lower supporting foot affixed to the extendable member for contacting with the ground and providing support for the device and a supported horse's leg.

3. The equine leg rest of claim 1, wherein the height-adjustable extendable member is slidably adjustable with respect to the human leg support member.

4. The equine leg rest of claim 3, wherein the height adjustment is made with a screw type fastening device that releasably holds the height-adjustable extendable member to die human leg support member.

5. The equine leg rest of claim 1, wherein the extendable member is supported for slidable movement relative to the leg support member by a pair of retaining plates attached to opposite sides of the leg support member.

6. The equine leg rest of claim 1, wherein the U-shaped hoof support cradle comprises a generally U-shaped half cylindrical metal trough and replaceable polyurethane padding.

7. The equine leg rest of claim 1, wherein the human leg support member includes replaceable polyurethane padding.

8. The equine leg rest of claim 1, wherein the retaining device comprises a pair of removable elongate pliable straps that extend from one lateral edge of the leg support member to an opposite lateral edge.

9. The equine leg rest of claim 8, further comprising a plurality of retaining balls mounted to the sides of the leg support member, for engaging with corresponding slotted openings in the pliable straps and retaining: the straps.

10. An equine leg rest that is wearably supported on a human's leg, for supporting the lower leg of a horse, comprising:
   a generally U-shaped hoof support cradle for receiving and supporting the lower leg and/or hoof of a horse;
   replaceable padding affixed within the U-shaped hoof support cradle;
   a generally trough-like, elongate human leg support member adapted to be held in position along the lower leg of a human being;
   at least one pliable leg strap including a plurality of slotted openings, for releasably receiving and holding retaining balls mounted to the leg support member to attach the leg support member to a wearer's lower leg;
   at least a pair of retaining balls mounted to the leg support member for releasably holding a pliable leg strap;
   a slidably adjustable extendable member affixed to the human leg support member, for providing a height adjustment to the U-shaped hoof support cradle;
   a lower supporting foot affixed to the extendable member for contacting with the ground and providing support for the device and a supported horse's leg; and
   the U-shaped hoof support cradle mounted to the upper region of equine leg rest, but extending to a side of the human leg support member such that the U-shaped cradle extends outwardly of a human's leg for supporting a horse's leg while the lower supporting foot rests on the ground to provide support.

11. The equine leg rest of claim 10, wherein a height adjustment to the U-shaped hoof support cradle is made with a screw type fastening device that releasably holds the slidably adjustable extendable member to the human leg support member.

12. The equine leg rest of claim 10, wherein the extendable member is supported for slidable movement relative to the leg support member by a pair of retaining plates attached to opposite sides of the leg support member.

13. The equine leg rest of claim 10, wherein the U-shaped hoof support cradle comprises a generally U-shaped metal trough.

14. The equine leg rest of claim 10, wherein the human leg support member includes replaceable polyurethane padding.

15. An equine leg rest that is wearably supported on a human's leg, for supporting the lower leg of a horse, comprising:
   a human leg support member adapted to be held in position along the lower leg of a human being;
   a generally U-shaped hoof support cradle operative associated with the human leg support member for receiving and supporting the lower leg and/or hoof of a horse and extending to a side of the human leg support member such that the U-shaped cradle extends outwardly of a human's leg for supporting a horse's leg;
   a height adjusting mechanism for adjusting the height of the U-shaped hoof support cradle relative to the ground;
   a retaining device affixed to the human leg support member for releasably retaining the leg support member to a human leg; and
   a ground contacting foot operatively associated with the human leg support member for transmitting weight of a horse's leg to the ground.

16. The equine leg rest of claim 15, wherein the human leg support member is elongate and generally trough-like.

17. The equine leg rest of claim 15, wherein the height adjusting mechanism comprises a slidably adjustable extendable member that slides relative to the human leg support member.

18. The equine leg rest of claim 17, wherein the ground contacting foot is affixed to the bottom end of the extendable member.

19. The equine leg rest of claim 15, wherein the U-shaped hoof support cradle is affixed to the upper end of the human leg support member.

20. The equine leg rest of claim 15, further comprising replaceable polyurethane foam padding affixed to the interior of the hoof support cradle.

* * * * *